(No Model.)

J. E. A. UHRIG.
WATCH BALANCE.

No. 311,797. Patented Feb. 3, 1885.

Witnesses:
C. Sedgwick
A. H. Davis

Inventor:
J. E. A. Uhrig
By Munn & Co
Attorneys.

UNITED STATES PATENT OFFICE.

JOHANN ERNST ADOLPH UHRIG, OF LONDON, COUNTY OF MIDDLESEX, ENGLAND.

WATCH-BALANCE.

SPECIFICATION forming part of Letters Patent No. 311,797, dated February 3, 1885.

Application filed July 23, 1884. (No model.)

*To all whom it may concern:*

Be it known that I, JOHANN ERNST ADOLPH UHRIG, of Quadrant Road, Essex Road, London, in the county of Middlesex, England, have invented a new and useful improvement in continuous secondary or auxiliary compensations for the balances of chronometers and other time-pieces, of which the following is a full, clear, and exact description.

My invention relates to an improved continuous secondary or auxiliary compensation for the balances of chronometers, watches, and other time-pieces; and it has for its object to eliminate the error which occurs at the extremes of temperature when the balance is adjusted for medium temperatures; and the invention consists in the combination, with the rim of the balance, of curved springs so applied as to cause the segments of the compound rim to move in an increasing or accelerating ratio toward the center of the balance when the temperature rises, this increasing ratio being capable of regulation by altering the form of the springs according to the amount of error to be corrected, so that the moment of inertia of the balance may be varied in more exact proportion to the variation in force of the balance-spring.

Figure 1:
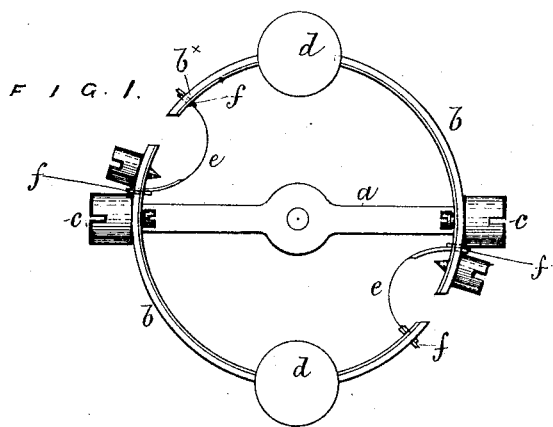

In the accompanying drawings, Figure 1 represents a plan of a chronometer-balance provided with my improved secondary or auxiliary compensation, the balance-spring being omitted.

$a$ is the main bar, to the ends of which are attached the bimetallic segments $b\,b$, forming the rim, provided with timing-screws $c\,c$, for adjusting the rate and compensation weights $d\,d$ for temperature, all as usual in the compensated balances of chronometers.

$e\,e$ are steel springs applied to act on the free ends of the segments $b$ in such a way that the tension of the springs produces an accelerating effect on the motion of the free ends of the segments inward toward the center of the balance, and a retarding effect in the opposite direction. This result cannot be obtained with a straight or a spiral spring, because when a spring is put into tension its strength is increased in the same ratio as the distance through which it is moved or deflected, and it is therefore necessary to give the spring such an initial curvature that the force by which it is deflected when the balance expands constantly alters the form of its curvature, and thereby causes the tension of the spring to become increased in an accelerating ratio for equal parts of radial motion of the free extremity of the rim-segment.

Figure 2:
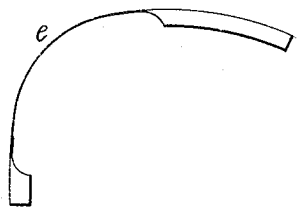
Figure 3:
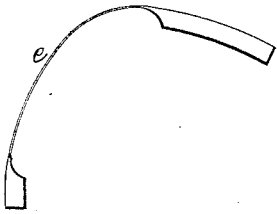

In carrying my invention into effect, as illustrated, I make a spring of about semicircular form and thin in the middle, as shown. I then place the ends of the spring through holes drilled in the rim near the main bar $a$ (or in the main bar $a$ itself) and near the free extremity $b^*$, and secure them by wedge-pins $f$. Having fixed one end of the spring, I draw the other end outward through its hole in the free end $b^*$, so as to give the spring sufficient initial tension at a medium temperature to insure its having some tension (however small) in the same direction at the maximum temperature. Having timed and adjusted for a medium temperature by the ordinary means, I proceed to ascertain whether the error at the extremes of temperature is a gaining or a losing one, and if the former the curvature of the spring must be altered so as to cause less acceleration, which is done by loosening the end of the spring that is held in the end $b^*$ of the rim and bending the spring, as represented in Fig. 2; or, if the error is a losing one, I flatten the spring, as shown at Fig. 3; or it may be necessary to change the spring for a longer or shorter one, as the case may be. After making each such variation in the form of the spring the primary compensation of course needs readjustment.

Figure 4:
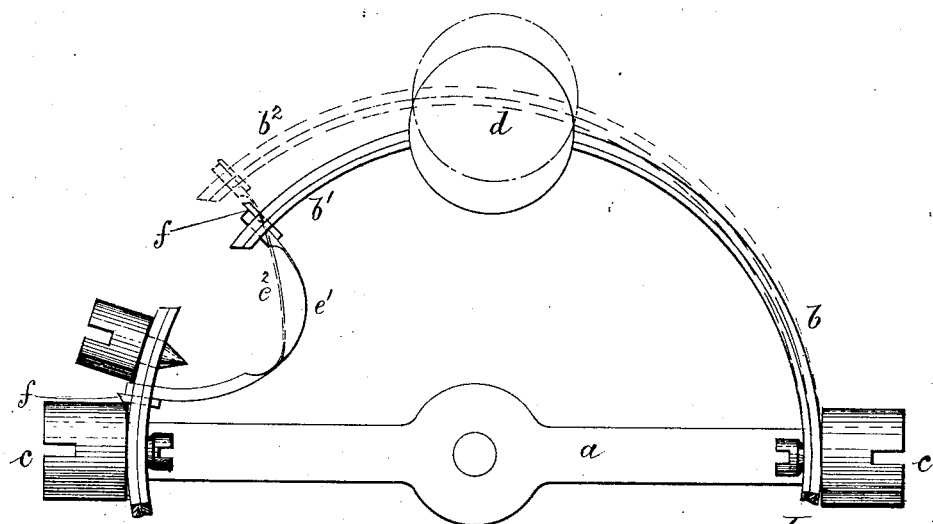

Fig. 4 shows, on an exaggerated scale, the change in curvature of the spring at the extremes of temperature. $b'\,b^2$ show the positions of the segment at the extremes of heat and cold, respectively, and $e'\,e^2$ the corresponding alterations in the form of the spring. The advantages of this secondary compensation are, first, absence of error at the extremes of temperature; second, absence of friction present in other auxiliary compensation-balances, and which is so detrimental to exact timekeeping; third, the balance is firm and compact, and not slender and easily shaken, like some other auxiliary compensations.

Having now particularly described and ascertained the nature of my said invention and in what manner the same is to be performed, I declare that what I claim is—

1. A balance for chronometers and other time-pieces, comprising bimetallic segmental arms and an intermediate connecting-spring, substantially as and for the purpose set forth.

2. In a balance for chronometers or other time-pieces, the bimetallic segmental arms, in combination with the spring having a tension to produce an accelerating effect upon the inward movement of said arms and a retarding effect upon their outward movement, substantially as and for the purpose set forth.

JOHANN ERNST ADOLPH UHRIG.

Witnesses:
JOHN DEAN,
HERBERT E. DALE,
*Both of 17 Gracechurch Street, London.*